United States Patent

Thompson

[11] 4,018,689
[45] Apr. 19, 1977

[54] COMPOSITION AND METHOD FOR REDUCING THE SURFACE TENSION OF AQUEOUS FLUIDS

[75] Inventor: James L. Thompson, Tulsa, Okla.

[73] Assignee: The Dow Chemical Company, Midland, Mich.

[22] Filed: Jan. 12, 1976

[21] Appl. No.: 648,596

Related U.S. Application Data

[63] Continuation-in-part of Ser. No. 527,576, Nov. 27, 1974, abandoned.

[52] U.S. Cl. .................... 252/8.55 C; 166/307; 252/8.55 R; 252/354; 252/355
[51] Int. Cl.² .................... E21B 43/26; E21B 43/27
[58] Field of Search ............ 252/8.55 R, 8.55 C, 252/8.55 D, 8.5 C, 354, 355; 166/307, 308

[56] References Cited

UNITED STATES PATENTS

| | | | |
|---|---|---|---|
| 2,759,019 | 8/1956 | Brown et al. | 252/355 X |
| 2,765,851 | 10/1956 | Bond | 252/8.55 X |
| 3,122,204 | 2/1964 | Oakes | 252/8.55 X |
| 3,301,328 | 1/1967 | Campion | 252/8.55 X |
| 3,772,195 | 11/1973 | Francen | 252/354 X |
| 3,819,520 | 6/1974 | Jones et al. | 252/8.55 |

*Primary Examiner*—Herbert B. Guynn
*Attorney, Agent, or Firm*—Bruce M. Kanuch; G. H. Korfhage

[57] ABSTRACT

The functioning of a perfluorinated compound corresponding to the formula

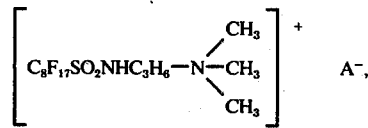

wherein $A^-$ is $Cl^-$, $F^-$ or $Br^-$, preferably $I^-$, to lower the surface tension of various aqueous based liquids (e.g. acids, spent acids, brines, water, etc.) and corresponding gelled liquids, when such fluids are employed in environments where they come in contact with earthen formations is improved by also incorporating into the liquid certain other water wetting surfactants.

14 Claims, No Drawings

COMPOSITION AND METHOD FOR REDUCING THE SURFACE TENSION OF AQUEOUS FLUIDS

CROSS-REFERENCE TO RELATED APPLICATION

This application is a continuation-in-part of application Ser. No. 527,576, filed Nov. 27, 1974, now abandoned.

BACKGROUND OF THE INVENTION

For various reasons it is often desired to lower the the surface tension of aqueous liquids. For example, by lowering the surface tension of aqueous liquds, solid matter can be more easily wet by the liquid. This property is useful, for example, when treating subterranean formations with various aqueous liquids to stimulate the flow of petroleum and/or aqueous fluids therefrom. Thus, it is desirable to, for example, employ acidizing, hydraulic fracturing, and other aqueous treatment liquids having low surface tensions.

Low surface tension values in combination with the water wetting properties of an aqueous liquid reduce the capillary forces in the formation being treated. Reduction of the capillary forces in a reservoir results in a more effective recovery of fluids after the formation has been treated. The present invention concerns the discovery of a composition which, when added to an aqueous liquid, effectively reduces the surface tension thereof and also increases the water wetting properties of the liquid.

Various quaternized perfluoroalkane-sulfonamidopolymethylenealkylamine compounds are known to reduce the surface tension of neutral, acidic and basic aqueous solutions even when present in minute amounts (see U.S. Pat. No. 2,759,019). However, these compounds were found to become ineffective when the aqueous solution in which they were employed came into contact with earthen formations. Thus, the use of such compounds in liquids employed to treat, for example, subterranean formations is limited. The present invention concerns the discovery of how to effectively make use of the surface active properties of such compounds in these types of liquids.

SUMMARY OF THE INVENTION

The invention comprises an aqueous composition, a method of reducing the surface tension of aqueous liquids and a method for treating subterranean formations to stimulate the flow of fluids therethrough.

The composition comprises (i) an aqueous liquid containing an effective amount of a compound of the formula

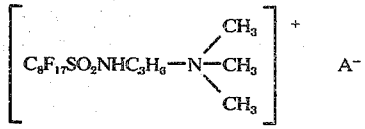

wherein $A^-$ is a halide; (ii) an aqueous dispersion (A) containing as percent by weight: polyethylene glycol monostearate, 57 percent; sodium di(2-ethylhexyl) sulfosuccinate, 19.2 percent; di-2-ethylhexyl maleate, 3 percent; isooctyl alcohol, e.g. ethylhexanol, 10.1 percent; isopropyl alcohol, 4.5 percent; and water, 6.2 percent; and (iii) a third surfactant selected from the group consisting of (B) an adduct of a $C_{10}$–$C_{12}$ alcohol with five moles of ethylene oxide, (C) an adduct of trimethyl-1-heptanol with seven moles of ethylene oxide, and mixtures of said (B) and (C) adducts.

DETAILED DESCRIPTION OF THE INVENTION

The aqueous liquids comprise acidic, neutral and alkaline solutions and can be gelled, contain noninterfering functional additives such as corrosion inhibitors, freeze point depressants, weighting agents, proppants, alcohols, and the like.

The combination of the fluorinated compound and the other surfactants are employed in a combined amount ranging from about 0.02 to about 0.2 percent by weight of an aqueous liquid. The exact amount will depend on the particular aqueous liquid they are dispersed in. For example, in concentrated acid solutions, e.g., HCl, HF and the like, the combination of materials are employed in an amount ranging from about 0.1 to about 0.2 percent by weight of the aqueous acid solution. In brines, the combination of compounds is employed in an amount ranging from about 0.02 to about 0.1 percent by weight of the brine.

The aqueous liquids containing the combination of surfactants can be employed in many uses wherein low surface tension properties are desired, e.g., matrix acidizing, water-base fracturing, fracture-acidizing and emulsified acids employed in acidizing-fracturing techniques. Such liquids are particularly useful for treating subterranean formations to perfect or make more efficient the recovery of fluids, e.g., petroleum fluids (oil and gas), water, other gases etc., therefrom.

In one particular utility, the efficiency of an acidizing solution is greatly increased by incorporating therein the perfluorinated compound, surfactant A, and at least one of the third identified water wetting surfactants (B) or (C). For example, in acidizing with HCl solutions, the surface tension of the resulting solution can be drastically reduced by employing therein from about 0.1 to about 0.2 percent by weight of the combination of surfactants previously identified. The acidizing solution is then used in standard acidizing procedures, i.e., it can be used in standard matrix acidizing process, in acidizing-fracturing processes and the like. It has been found that such acidizing solutions penetrate the formation more easily, thereby effecting a greater stimulation of the production of fluids. Also, such solutions are more easily removed from the formation following the acidizing treatment.

It has been also discovered that the aqueous solution is quite effective for acidizing gas producing formations. The use of aqueous liquids to treat gas producing formations has produced particular difficulties because aqueous liquids tend to block the intricacies of the formation to the flow of gases. Thus, in many instances, such solutions have hindered instead of stimulated the flow of gas from the formation. When fracturing a gas producing formation, it has been the practice to employ nonaqueous fracturing fluids such as oils, $CO_2$-methanol mixtures and the like. However, because aqueous liquids can be considerably less expensive and also are generally more available than other such fluids, it is desired to use aqueous liquids if possible. The present discovery now permits such use.

The individual surfactants can be blended directly into an aqueous treatment liquid or they can be premixed and easily blended into a treatment liquid employing standard equipment employed in fracturing and acidizing treatments. The premix may also contain water, mono and/or polyhydric alcohols, and other functional additives.

A representative blend which can be prepared and employed in the practice of the present invention comprises as parts by weight, 4467 parts H₂O (or a mixture of, for example, water and an alcohol), 2655 parts of the surfactant identified as (A); 836 parts of the surfactants identified as (B) or (C) and 40 parts of the above identified perfluorinated compound wherein A⁻ is iodide. It is to be understood that the quantitative amounts set forth in this paragraph are not sharply critical, but rather are included for purposes of illustration only.

Blends such as that described in the preceding paragraph are employed in amounts ranging from about 2 to about 4 gallons per 1000 gallons of an acid, e.g. hydrochloric acid (3 to 28 percent strength), hydrochloric-hydrofluoric acid mixtures, aqueous fracturing fluids and other aqueous fluids to lower the surface tension thereof. Higher concentrations are recommended for matrix acidizing treatments while lower concentrations can be employed in fracturing treatments.

As indicated the aqueous liquids in which the combination of surfactants can be successfully employed contain other functional additives such as thickening and gelling agents weighting agents, corrosion inhibitors and the like. The compatibility of the combination of surfactants with other functional additives should be ascertained prior to preparing large quantities of such aqueous liquids.

A preblend was prepared containing, as parts by weight 2502 H₂O; 1967 isopropyl alcohol; 2655 parts of a mixture containing as percent by weight, 57.0 percent polyethylene glycol monostearate, 19.2 percent sodium di(2-ethylhexyl) sulfosuccinate, 3 percent di-2-ethylhexyl maleate, 10.1 percent isooctyl alcohol, 4.5 percent isopropyl alcohol and 6.2 percent water; and 836 parts of an adduct of trimethyl-1-heptanol plus seven moles of ethylene oxide; and 40 parts of the iodide salt of the previously defined perfluoronated compound. The weight ratio of perfluorinated compound to other surfactants in the preblend was 40:3491, or about 1:87. Aqueous mixtures were prepared containing an equivalent of 2 gallons of the preblend with 1000 gallons of various liquids. The surface tension of the mixtures were determined employing a DuNouy Tensiometer. The liquids employed, their original surface tension, and the resulting surface tension are set forth in the following Table.

TABLE

| Test No. | Liquid | Original Surface Tension-dynes/cm | Final Surface Tension-dynes/cm |
|---|---|---|---|
| 1 | 3 HCl* | 32.1 | 21.3 |
| 2 | 7.5 HCl | 31.2 | 20.5 |
| 3 | 15 HCl | 30.2 | 21.5 |
| 4 | 28 HCl | 30.1 | 21.8 |
| 5 | 12-3 HCl—HF | 31.5 | 21.4 |
| 6 | Spent 3 HCl** | 36.2 | 19.3 |
| 7 | Spent 15 HCl | 34.5 | 24.3 |
| 8 | H₂O | 72.0 | 22.9 |
| 9 | Brine*** | 74.3 | 22.8 |

*The number indicates strength of acid in weight percent. All the acids contained about 0.5 per cent by weight of a corrosion inhibitor of the type disclosed in U.S. Patent No. 3,634,270
**Spent acid was prepared by reacting the line acid with a sufficient quantity of CaCO₃ to neutralize the acid.
***The brine was an aqueous solution containing 8 per cent by weight of sodium chloride and 2.5 per cent of calcium chloride.

What is claimed is:

1. An aqueous composition suitable for use in treating subterranean formations comprising:

A. an aqueous liquid; and dispersed in said aqueous liquid,
B. an effective amount of a perfluorinated surfactant of the formula

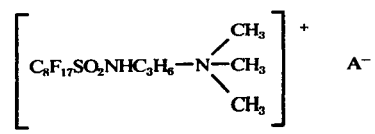

wherein A⁻ is Cl⁻, F⁻, I⁻ or Br⁻;
C. a second surfactant blend comprising as percent by weight, 57 percent polyethylene glycol monostearate; 19.2 percent sodium di(2-ethylhexyl) sulfosuccinate; 3.0 percent di-2-ethylhexyl maleate; 10.1 percent isooctyl alcohol; 4.5 percent isopropyl alcohol and 6.2 percent water; and
D. a third surfactant selected from the group consisting of an adduct of a C₁₀–C₁₂ alcohol with five moles of ethylene oxide, an adduct of trimethyl-1-heptanol with seven moles of ethylene oxide, and mixtures thereof; the total amount of said perfluorinated compound and other surfactants being present in said aqueous liquid in an amount ranging from about 0.02 to about 0.2 percent by weight of said composition.

2. The composition of claim 1 wherein the composition is gelled.

3. The composition of claim 1 having a perfluorinated compound: other surfactant weight ratio of about 1:87.

4. The composition of claim 1 wherein the third surfactant is an adduct of a C₁₀–C₁₂ alcohol with five moles of ethylene oxide.

5. The composition of claim 1 wherein the third surfactant is an adduct of trimethyl-1-heptanol with seven moles of ethylene oxide.

6. The composition of claim 1 including in addition an alcohol in an amount greater than present in said second surfactant blend.

7. The composition of claim 1 wherein the aqueous liquid is acidic.

8. The composition of claim 7 wherein the acidic aqueous solution is an aqueous solution of HCl.

9. In the method of stimulating the flow of a fluid from a subterranean formation wherein a portion of the formation is solubilized with an aqueous acid solution the improvement which comprises:
employing the composition defined in claim 1 wherein said aqueous liquid is an acid in which at least a portion of said subterranean formation is soluble.

10. The method of claim 9 wherein the formation is also fractured.

11. In the method of stimulating the flow of fluid from a subterranean formation wherein the formation is fractured by introducing an aqueous fracturing fluid through a borehole and into contact with said formation under sufficient pressure to fracture the formation, the improvement which comprises: employing as the fracturing fluid the composition of claim 1.

12. The method of claim 11 wherein the flow of fluid to be stimulated is petroleum gas.

13. The method of claim 11 wherein the aqueous liquid of claim 1 is an acid solution in which at least a portion of the formation is soluble.

14. The method of claim 13 wherein the aqueous liquid is aqueous HCl.

* * * * *